United States Patent

Tallegas

[15] 3,676,855

[45] July 11, 1972

[54] CONNECTING NETWORK ARRANGEMENT FOR TIME SWITCHING

[72] Inventor: Francois Tallegas, La Clarte Ploumanach, France

[73] Assignees: C.I.T.-Compagnie Industrielle des Telecommunications, Paris; Societe Lannionnaise D'Electronique, Lannion, France

[22] Filed: Aug. 11, 1970

[21] Appl. No.: 62,935

Related U.S. Application Data

[63] Continuation-in-part of Ser. No. 692,144, Dec. 20, 1967, abandoned.

[30] Foreign Application Priority Data

Dec. 23, 1966 France ..................................6688745

[52] U.S. Cl. ..........................................340/172.5, 179/18 J

[51] Int. Cl.......................................H04m 3/00, H04m 9/00

[58] Field of Search....................340/172.5; 179/18 J, 15 AQ

[56] References Cited

UNITED STATES PATENTS

| | | | |
|---|---|---|---|
| 3,458,659 | 7/1969 | Sternung | 179/18 J |
| 3,401,380 | 9/1968 | Bell | 340/172.5 |
| 3,458,658 | 7/1969 | Aro | 179/18 J |
| 3,499,120 | 3/1970 | Fischer | 179/18 J |

*Primary Examiner*—Paul J. Henon
*Assistant Examiner*—Ronald F. Chapuran
*Attorney*—Sughrue, Rothwell, Mion, Zinn & Macpeak

[57] ABSTRACT

The invention relates to a connecting network arrangement, in a system for the time switching of analog or digital data comprising one buffer memory per incoming network line, a distributor serving a certain number of outgoing network lines, a junction line serving each distributor, and a control memory being allocated to each junction line.

6 Claims, 7 Drawing Figures

CONNECTING NETWORK ARRANGEMENT FOR TIME SWITCHING

This is a continuation-in-part of application Ser. No. 692,144 now abandoned filed Dec. 20, 1967.

BACKGROUND OF THE INVENTION

The present invention concerns a telecommunications system designed for time switching, and it concerns more particularly that part of such a system which is called the connecting network.

The connecting network according to the invention may be employed more particularly in telephone switching systems operating in accordance with the principle of time-division multiplex or time switching. As is known, in a time-switching system, items of information which are to be exchanged modulate pulse trains which are staggered in relation to one another, which renders possible multiple utilization of the junction lines.

SUMMARY OF THE INVENTION

It is assumed herein that in the general arrangements adopted for establishing urban telecommunications time-switching centers, the subscribers are connected to the modulation equipment of the concentration stages or concentrators which comprise switching stages between subscribers' lines and a pulse code modulation highway to concentrate subscriber traffic to form groups of 500 subscribers, each subscriber group being served by two incoming network lines and two outgoing network lines between the subscriber stage and the connecting network. The modulation equipment comprises electronic devices in a time-division network which converts analog modulation into pulse modulation. The concentrators have access to the connecting network through circuit modulation equipment or circuit synchronization equipment, depending upon whether the circuits work on an analog basis or on a digital basis. The circuit equipment, such as the subscribers equipment, is connected to the connecting network by two network lines. Both types of equipment are called, in this network, selection units. The basic transmission unit of a network line is the 32 channel multiplex (31 speech channels and one signalling channel), which is called a primary multiplex. Normally, a network line transmits during 125 microseconds 32 signals of 3.9 microseconds, each signal of 3.9 microseconds corresponding to one time channel. The 32 time channels are coded on a seven-unit code and sampled at 8 kc/s, which corresponds to an output of binary information at 32 × 7 × 8 Kilobits/sec (Kb/s), or 1,792 Kb/s. In the time switching center, this 32 channel multiplex is divided into seven wires, one wire per code unit, the combination of the seven wires forming the network line. The switching and the transmission take place in four wires (two wires in each direction). Incoming network lines and outgoing network lines will therefore be present.

The general structure of the center is not the subject of the present invention, but in the following description, the essential features thereof will be given in order that the invention may be readily understood. The urban center comprises switching members which process the signals of the chain, i.e., devices and circuits for transmission of speech symbols between two subscribers, control members which supervise the subscribers' lines or circuits, a time-base circuit which supplies the signals necessary for the synchronization of the station and a monitoring member for monitoring the operation of all the sub-units of the station.

The object of the connecting network according to the invention is to route along N outgoing network lines each having P time channels, the items of information contained in the N incoming network lines having P time channels. At each instant, it must be possible to route the items of information contained in the pth time channel of the nth incoming network line along the $p$'th time channel of the $n$'th outgoing network line, $p$, $n$, $p'$ and $n'$ being any numbers. Also all the NP incoming time channels must be capable of being routed along the NP outgoing time channels.

An essential feature of the connecting network according to the invention is that it is free from blocking, because it is always possible by means of memories, to connect together any two time channels of any two network lines or even of a common network line. It is thus unnecessary for an incoming time channel of order $p$ to transmit to the corresponding outgoing time channel also of order $p$. Transmission is effected simply to an available outgoing time channel which may or may not form part of the same network line.

According to the invention, the connecting network which forms part of the switching members contains a buffer memory for each incoming network line, a distributor serving a certain number of outgoing network lines, and a junction line serving each distributor, a control memory being allocated to each junction line and the total number of incoming network lines being equal to the product of the number of distributors times the number of outgoing network lines served by each of them.

One feature of the non-blocking time-switching connecting network according to the invention resides in the allocation of a control memory to a junction line, whereby it is possible to derive full benefit from the time-division multiplexing.

A further feature of the connecting network according to the invention is that the control memories employ circulating memories using, for example, looped shift registers or delay lines. Such equipment simplifies the structure of the memory and the processing of the information contained therein.

A further feature of the invention is that the control memory may be integral or divided into as many elemental memories as are necessary. For example, there may be one elemental memory per network. The elemental memories would then be sampled, to find along the address line items of information distributed in time which are identical to those which would be found in the case of a single memory. In such a case, the elemental memories are mounted in parallel, and the items of information are placed in series and compressed in terms of time on the same address line, in accordance with known techniques.

In accordance with yet another feature of the invention, the primary time channel is divided, along the junction lines, into $N_2 + 1$ secondary time channels, $N_2$ being the number of outgoing network lines per group, so that any time channel of a junction line may be distributed along any time channel of the $N_2$ network lines associated with the same junction line.

In accordance with one embodiment, the connecting network according to the invention consists essentially of:

$N$ buffer memories, one per incoming network line, each having P memory words, one per time channel, which are themselves composed of Q bits, in which the items of information contained in the N incoming network lines are temporarily stored.

$N_1$ junction lines; along each of which the items of information intended for a group of $N_2$ outgoing network lines ($N_1$ $N_2$ $N$) are time-multiplexed.

$N_1$ control memories, each of which, associated with a junction line, contains, for each time channel of each of the $N_2$ outgoing network lines of the group, the address of the buffer memory and the address of the word of this buffer memory at which the Q items of information intended for the corresponding junction line must be sought.

$N_1$ distributors which route from the junction lines, the items of information intended for the $N_2$ network lines of the group.

A time base circuit which distributes the signals for the synchronization of the whole arrangement.

Further features and advantages of the invention will become apparent in the course of the detailed description given in the following, with reference to the drawings, of a form of construction of a connecting network according to the invention.

The drawings are given by way of non-limiting example.

DESCRIPTION OF THE PREFERRED EMBODIMENTS

Figure 1:
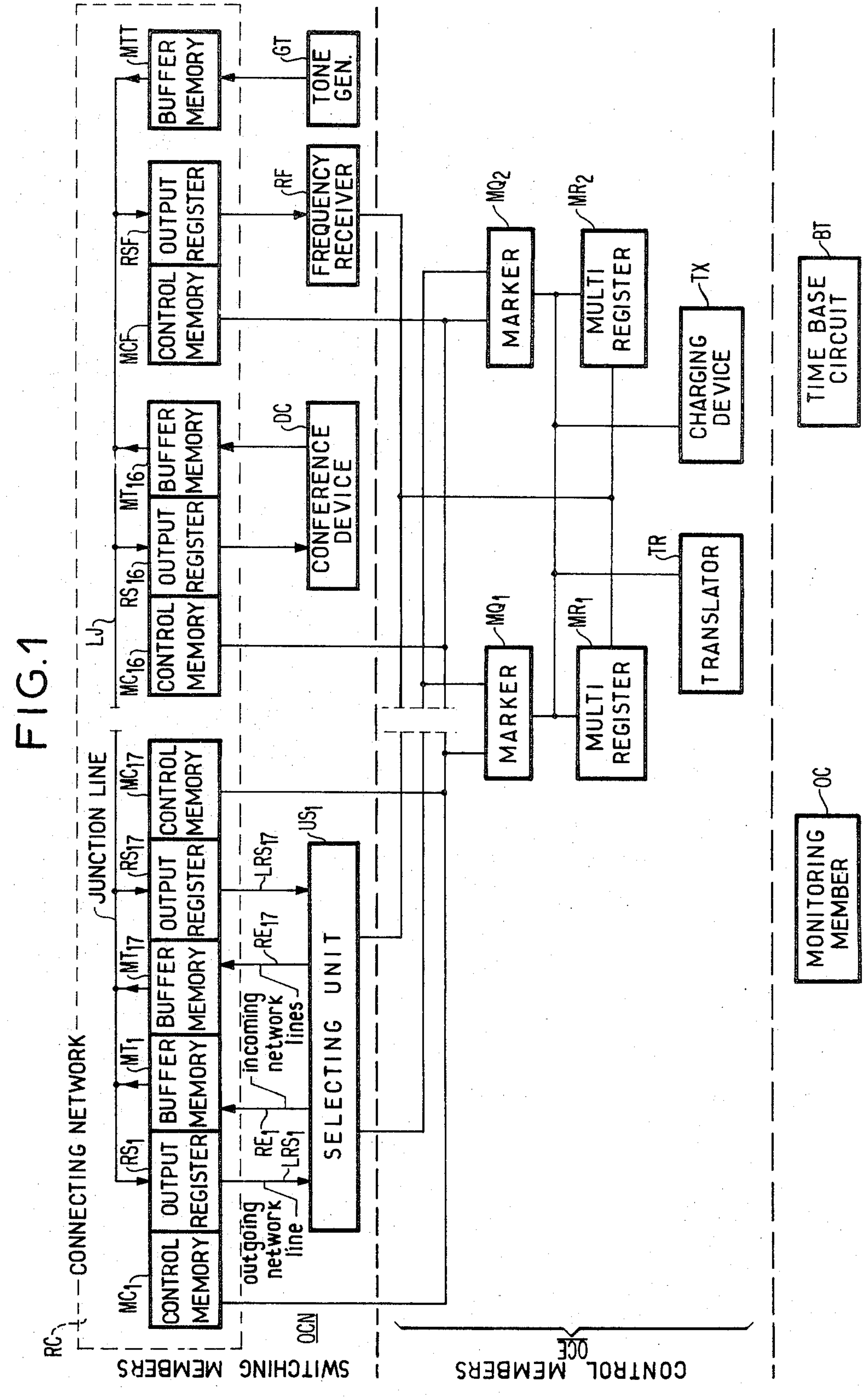
FIG. 1 is a general diagram of an urban center of known type.

The urban center (time switching system operating as a local exchange) of which the known construction is indicated in FIG. 1, comprises switching members OCN, control members OCE, a monitoring member OC and a time base circuit BT; these members are separated by a thick broken line in the figure. Such a construction is disclosed in U.S. Pat. No. 2,957,949.

The switching members OCN process the signals of the speech chain; they comprise on the one hand the connecting network RC (indicated by a block drawn with a thin broken line), the object of which is to place any time channel of an incoming network line in communication with any time channel of an outgoing network line, and on the other hand various line equipment for making the connecting network accessible to the subscribers and the circuits through specialized modulation equipment, distributed along selecting units such as $US_1$, $US_2$ .. $US_{15}$ (only $US_1$ is shown here). It may be assumed that, of the group of fifteen selecting units provided, there are, for example, eight subscribers' modulation units and seven circuit modulation units. The conference device DC may deal with ten conferences of three subscribers. The frequency receiver RF discriminates the numbering at the keyboard of the subscribers and where necessary the multi-frequency signaling of the circuits. The tone generator GT creates, in the form of pulse-coded modulation, the various tones intended for the subscribers, and where necessary the multi-frequency signaling intended for the circuits worked on an analog data basis. Between each selecting unit such as $US_1$ and the connecting network, there are two incoming network lines $RE_1$ and $RE_{17}$ leading respectively to the buffer memories $MT_1$ and $MT_{17}$ (at the unit $US_2$ there would be $MT_2$ and $MT_{18}$ respectively, and at the selecting unit $US_{15}$ there would be $MT_{15}$ and $MT_{31}$ respectively) and two outgoing network lines $LRS_1$ and $LRS_{17}$ proceeding respectively from the output registers $RS_1$ and $RS_{17}$ to the selecting unit $US_1$. The junction line LJ establish the time connections between the buffer memories MT and the output registers RS. The connection is effected as follows. With a incoming network line leading to a buffer memory and an outgoing network line extending from the output register, the items of information arriving are stored in the buffer memory. A control memory MC takes note of the addresses of the two time channels to be placed in communication. The items of information are thus transmitted from any incoming network line to any outgoing network line when so ordered by the control memory at a precise instant.

Of the two control members OCE, two marker units $MQ_1$ and $MQ_2$ control the operation of the connecting network and of the modulation equipment at the instant of the connections and disconnections. The two multi-registers $MR_1$ and $MR_2$ monitor the subscribers' lines or the circuits in the course of establishing or breaking communication. The translator TR contains the translation table of all the subscribers' lines. The charging device TX is provided to price the calls.

The time base circuit BT supplies all the signals necessary for the synchronization of the station. It may be either locally crystal-controlled (an asynchronous version of the network) or controlled by a signal extracted from a multiplex signal arriving from the tandem central office (a synchronous version of the network).

The monitoring member OC is connected to the information-processing center CTI. It permits the monitoring, from the information-processing center CTI, of the operation of all the sub-assemblies of the station and, where necessary it permits the placing out of service equipment which is indicated to be defective.

Figure 2:
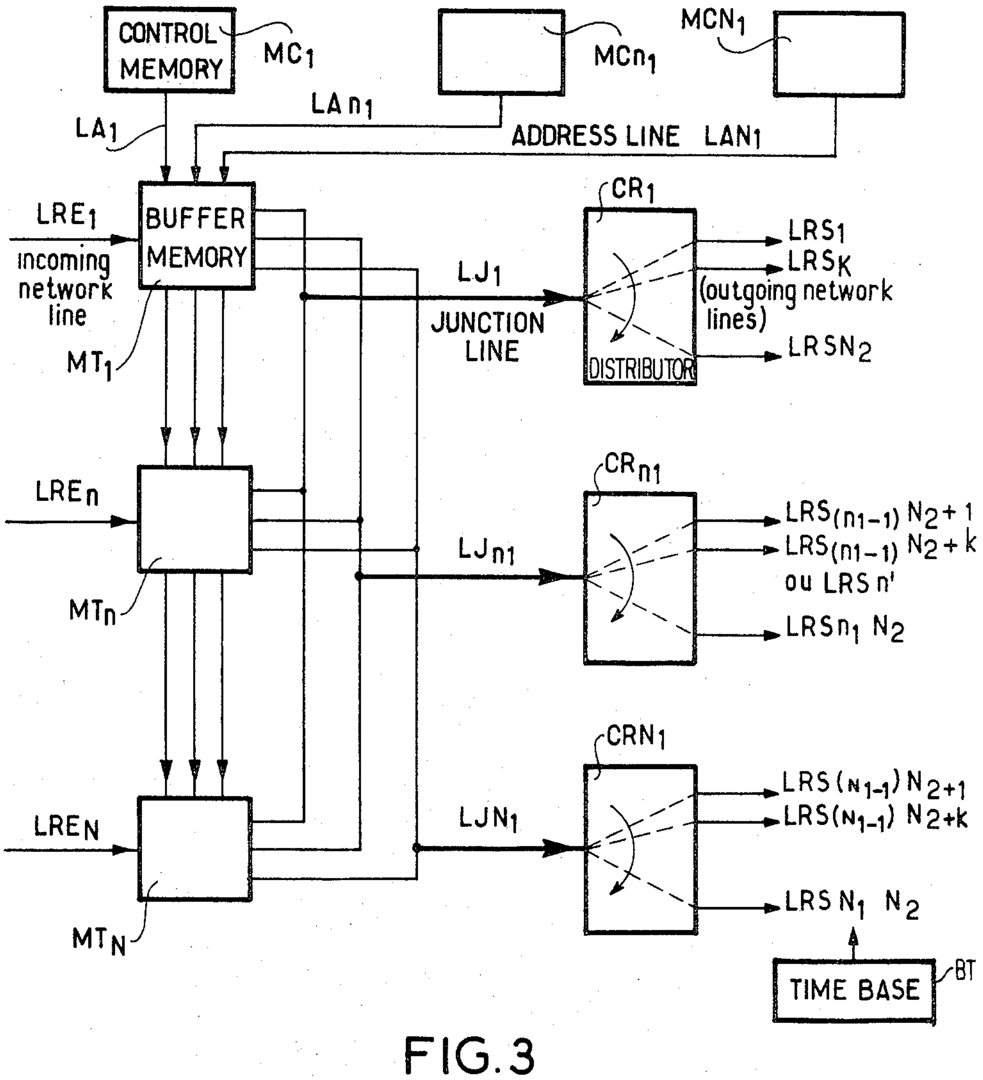
FIG. 2 is a general diagrammatic illustration of a connecting network according to the invention.
Figure 3:
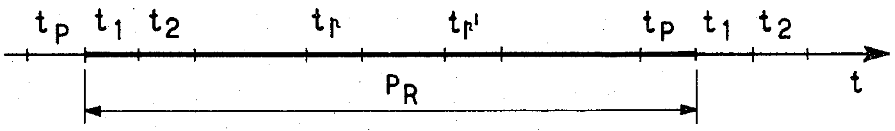
FIG. 3 illustrates the division of the repetitive operating period of the network into P primary time channels.

FIG. 2, which diagrammatically illustrates one form of construction of a connecting network according to the present invention, comprises a number $N$ of incoming network lines $LRE_1$, $LRE_2$ ....$LRE_N$ each leading respectively to the buffer memories, $MT_1$, $MT_2$ ....$MT_N$. Each buffer memory is composed of seven memories, each having 32 points corresponding to the seven wires of the network line and to their 32 time channels each. The memory words, numbered from 0 to 31, are each allocated to the time channel of like number. Because the sampling frequency is 8 kc/s, the duration of a time channel along the network line is therefore $1/8{,}000 \times 32$, or about 3.9$\mu$s. This is illustrated in FIG. 3. It will be assumed that the network line consists of P time channels each of 3.9$\mu$s. These channels are called primary time channels and are numbered from $t_1$ to $t_p$. In order to place these channels in communication with the words of the buffer memory, the channels may also be numbered from $t_0$ to $t_{31}$, $t_0$ being the channel reserved for signaling. The repetitive operating period of the network is $P_R$, which here corresponds to 1/8,000 sec, or 125$\mu$s.

The outgoing network lines $LRS_1$ . . . $LRSN_2$ . . . $LRSN_1$ $N_2$ consist of a number of groups $N_1$ each comprising a number of lines $N_2$. Each group serves the lines which are attached thereto by a distributor $CR_1$. . . $CRn_1$. . .$CRN_1$, which in turn serves a junction line. There are therefore as many distributors as there are junction lines. This corresponds to a non-blocking network when the number of outgoing network lines is greater than the number of incoming network lines, for example, for conference call or data transmission. A non-blocking switching network is a system in which it is always possible to establish a connection from an idle input to an idle output regardless of the number of calls sensed by the system.

The $N_2$ outgoing network lines of the first group (leaving the distributors $CR_1$) are numbered consecutively $LRS_1$, $LRS_2$...$LRSN_2$. Those of the nth group (distributors $CRn_1$) are numbered consecutively LRS $(n_1 - 1) N_2 + 1$, LRS $(n_1 - 1) N_2 + K$ ($k$ being the order in the group) ....LRS $n_1$ $N_2$. Finally, those of the $N_1$th group (distributor $CRN_1$) are numbered consecutively LRS $(N_1 - 1) N_2 + 1$, LRS $(N_1 - 1) N_2 + k$ ... LRS $N_1$ $N_2$ ($N_1$ $N_2$ being the total number of outgoing network lines).

To each junction line $LJ_1$ ... $LJn_1$ ... $LJN_1$ is assigned one control memory $MC_1$ ... $MCn_1$ ... $MCN_1$. For example, to the junction line $LJ_1$ is assigned the control memory $MC_1$ which contains as many memory blocks (or elemental memories) as there are outgoing network lines $N_2$ served by the junction line $LJ_1$. Each memory block contains as may words as there are temporal channels in an outgoing network line. Each work constituted by a certain number of binary elements, is assigned to an outgoing temporal channel of an outgoing network line, and contains the address of the buffer memory and of the work of this buffer memory where we will find the Q binary informations (bits) destined for this outgoing temporal channel assigned to the word of the control memory.

Figure 4:
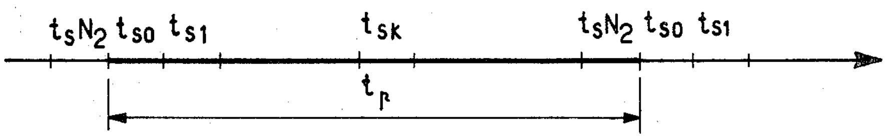
FIG. 4 illustrates the division of the primary time channel into $N_2 + 1$ secondary time channels along the junction line and along the address line in the case of only one junction line for $N$ buffer memories ($N_1 = 1$).

Like the network lines, the junction lines each comprise seven wires, each of the wires corresponding to a unit of the code. A binary seven-unit code may therefore transmit $2^7 = 128$ different states of the quantity to be measured. The time channel of the junction line is called the secondary time channel. This is represented in FIG. 4 where a primary temporal channel $tp$ is divided into $N_2 + 1$ secondary channels $t_{s0}$, $t_{s1}$ ... $t_{sk}$ ...$t_{sN_2}$ in the case where the number of junction lines is equal to 1 ($N_1 = 1$). Since the N incoming lines $LRE_1$ to $LRE_n$ each have $P$ primary temporal channels, all of the $P \times N$ primary temporal channels must pass through the single junction line. So that this will be possible, it is necessary that the number of outgoing temporal channels of all of the $N_2$ outgoing network lines be equal to not less than the number of $P \times N$ channels. If the number of channels per outgoing network line is also P channels, we must have $P \times N \leq PN_2$; only under this condition will it always be possible for an outgoing temporal channel to correspond to a primary temporal channel and we then say that the network is non-blocking.

If the connections between the N buffer memories $MT_1$ ... $MT_n$ and the distributors $CR_1$ ... $CRN_1$ are made with the aid of $N_1$ junction lines, each junction line will have to carry $PN_2$ temporal channels, we will then have $N_1$ ' $p \times N_2$ temporal channels for all of the $N_1$ junction lines. In that case, it will always be possible to connect an outgoing temporal channel to a primary temporal channel if we have $$PN \leq N_1 \times P \times N_2$$

which can also be written $N \leq N_1 = N_2$ since we are assuming that we have the same number of temporal channels $P$ per incoming or outgoing network line.

Figure 5:
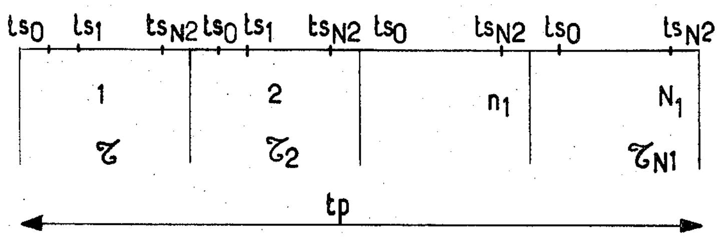
FIG. 5 illustrates the division of the primary time channel into $N_1$ parts, each part being divided into $N_2 + 1$ secondary channels.

FIG. 5 illustrate the case of $N_1$ junction lines as shown in FIG. 2. A primary temporal channel is divided into $N_1$ junction channels and each of these $N_1$ junction channels is divided into $N_2 + 1$ secondary temporal channels since each junction line serves $N_2$ outgoing network lines.

Each of the $N_1$ control memories $MC_1$ ... $MCN_1$ is connected by an address line $LA_1$ ... $LAn_1$ ... $LAN_1$ to all the buffer memories $MT_1$ ... $MTn$ ... MTN. Thus, the control memory $MC_1$ is connected by the same address line $LA_1$ to the various buffer memories $MT_1$, $MT_2$ ... MTN. Likewise, the control memory $MCn$ is connected by the same address line $LAn_1$ to the various buffer memories $MT_1$, $MT_2$ ... MTN, etc.

In the case of only one junction line, there is only one address line and each primary channel is divided along this address line into $N_2 + 1$ secondary channels. In the case of $N_1$ junction lines, there are also $N_1$ address lines and each primary channel is divided along one address line into $N_1$ parts, each part being in turn divided into $N_2 + 1$ secondary channels. One of these secondary time channels $tS_0$ is reserved for the writing in the buffer memory, the other $N_2$ being reserved for the reading of the buffer stores intended for the $N_2$ outgoing network lines of the group.

Figure 6:
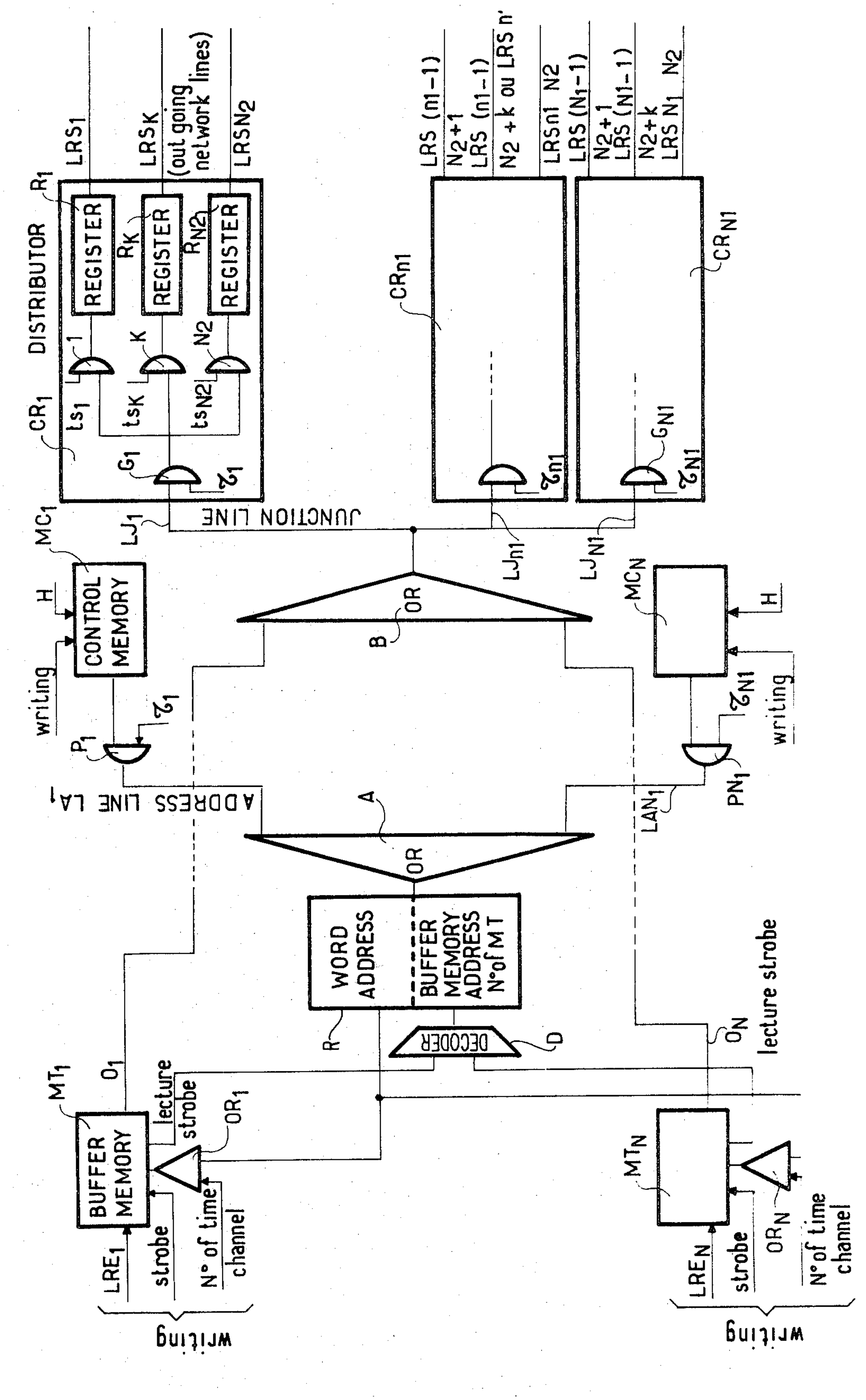
FIG. 6 illustrates a possible realization of the invention in the case of FIG. 2.

FIG. 6 represents one manner of realizing the invention shown in FIG. 2. The control memories $MC_1$...$MCN_1$ which are circulating memories, have their output connected to the input of an AND -gate $P_1$ to $P_{N1}$, the other input of these gates being connected to a clock furnishing the impulses $\tau_1, \tau_2, ... \tau_{N1}$. The output of the gate $P_2$ constitutes the address line $LA_2$...the output of the gate $PN_1$ constitutes the address line $LAN_1$. All the address lines $LA_1$...$LAN_1$ are grouped on an OR gate A whose output is connected to a register R divided in two parts. One of the parts records the number of the buffer memory MT which contains the desired information, and is connected to a decoder D which transmits an impulse (strobe pulse) to the buffer memory MT corresponding to the number transmitted by the command memory $MC_1$; the other part of the register contains the address of the word of the buffer memory containing the information. This address is transmitted to the gates $OR_1$...$OR_n$ and each of these gates can receive over another input, for writing, the number of a primary temporal channel. The output of the gates $OR_1$...$OR_{n1}$ is connected to the buffer memory to which it is associated.

The outputs $O_1$...$OR_N$ of the buffer memories $MT_1$...$MT_N$ are regrouped on an OR A gate B and the output of this gate is connected to the rotary switches $CR_1$...$CRN_1$ by the junction lines $LJ_1$...$LJN_1$. A rotary switch like $CR_1$ has an AND gate $G_1$ with one input connected to the junction line $LJ_1$ and the other input receives the clock impulse $\tau_1$ at the same time as the gate $P_1$ at the output of $MC_1$. The output of $G_1$ is applied to the AND gates 1, 2 – $k$, $N_2$receiving each respectively a clock impulse $t_{s1}$, $t_{s2}$, $t_{sk}$...$T_{sN2}$. The output of each of the AND gates 1...$k$...$N_2$is connected to a register $R_1$...$R_{N2}$, powering an outgoing network line $LRS_1$...$LRS_k$... $LRS_{N2}$.

Figure 7:
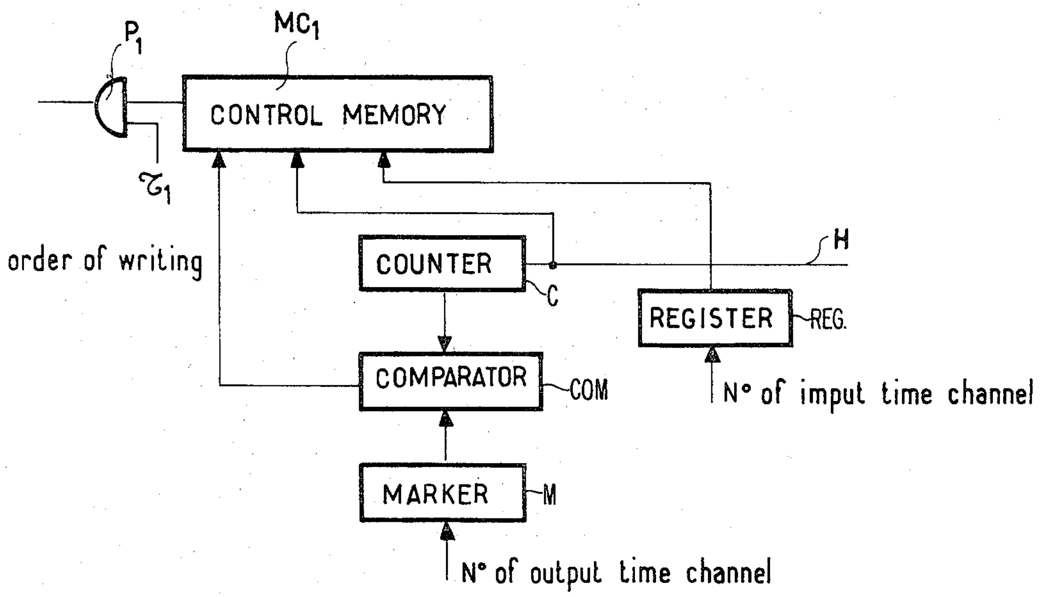
FIG. 7 illustrates the structure of the control of control memories.

FIG. 7 gives a diagram describing the manner in which the addresses of the temporal channels are entered in the command memory $MC_1$. This memory and a counter C receive the impulses $t_{s0}$, $t_{s1}$...$t_{sn2}$ and $\tau_1$... $\tau_{n1}$ over a clock circuit H. From the central network controls, a marker M receives the indication of the number of the outgoing network line LRS and of the outgoing temporal channel assigned to the called party whereas the number of the primary temporal channel assigned to the caller is transmitted to a register. The indications of the marker and of the counter are transmitted to a comparator COM which detects the coincidence, and then gives the instruction to write the information contained in the register REG, into the control memory $MC_1$. This information, i.e. the address of the caller which includes the number of the buffer memory $MT_n$ and the number of the temporal channel of the incoming network line $LRE_n$ of the memory $MT_n$, therefore occupies in the control memory a specific place; this memory consists of $N_2$ memory blocks, one per outgoing network line, and each block contains $P$ words, one per temporal channel of an outgoing network line, which are formed by a certain number of binary elements. Each memory block constitutes a circulating memory with the $P$ blocks in parallel, (i.e. circulating in synchronism while the $P$ words of a block pass during the time $P_R$ which is the period of repetitive operation of the network as indicated in FIG. 3.

Sampling of the control memory consists in successive reading of the $N_2$ words of the memory blocks appearing at the output at a given instant $\tau_n$. Accordingly, at a given instant $\tau_n$ the $N_2$ memory blocks present at the output the same number of the word assigned to a given channel of each outgoing network line $LRS_1$...$LRS_{N2}$. The $N_2$ words are read in series at the instants $t_{s1}$, $t_{s2}$, the $N_1$ $N_2$ words of the temporal channels of the same number of the $N_1$ output switches being all read during the duration tp of a primary, or outgoing, temporal channel since we assumed that each outgoing line has the same number of temporal channels as an incoming line; the control memory $MC_1$ advances by one word and, at the instant $tp + \tau_n$, we again read $N_2$ words present at the output of $MC_1$. This is illustrated in FIGS. 4 and 5. This procedure therefore enables us to read in $MC_1$, at a given instant, all information corresponding to a number of the temporal channel concerned on all the outgoing lines of the same rotary switch.

The operation of the device according to the invention shown in FIGS. 2 and 6 is as follows: Let us assume that we have 32 incoming net-work lines $LRD_1$ to $LRE_{32}$ and that the 22nd temporal channel of the incoming network line No. 8 ($LRE_8$, $n = 8$) is assigned to the calling party while the 17th temporal channel of outgoing network line No. 3 of the 2nd rotary switch $CR_2$ is assigned to the called party; it is clear that we have 4 groups of 8 outgoing network lines ($N_1 = 4$; $N_2 = 8$). Each distributor serves 8 outgoing lines; the 3rd line of $CR_2$ has the number $LRS_{11}$.

The information contained in temporal channel 22 is therefore stored at the instant $tp_{22}$ at the point 22 of the buffer memory $MT_8$. In the control memory $MC_2$ corresponding to the distributor $CR_2$, the address of word 22 of buffer memory $MT_8$ is written in memory block No. 3 (corresponding to $LRS_{11}$) and at the word 17 (temporal channel 17) of this memory block. The process of read-in is indicated in FIG. 7. This address is furnished by the control memory $MC_2$ at the instant $\tau_2/t_{s3}$ corresponding to the temporal channel $tp_{17}$, i.e., when this channel is present at the output of the circulating control memory $MC_2$. This address is transmitted by the gate $P_2$ and by the address line $LA_2$ to the OR gate A (FIG. 6); the address issues from gate A and is held in a register, the part of the address corresponding to the i.e. of buffer memory id decoded, and the decoder transmits a reading impulse (strobe reading) to MT $_8$. The part of the address corresponding to the number of the temporal channel is transmitted to the OR gates $OR_1$...$OR_N$ and since only the buffer memory $MT_8$ receives the reading impulse (strobe reading), only this memory will be read at word 22 where the information is stored.

This information from $MT_8$ is directed to the OR gate B whose output is connected to the junction lines and specifically to $LJ_2$. The AND gate $G_2$ of the rotary switch $CR_2$ receives, at the same time as the gate $P_2$, a clock impulse $\tau_2$, opens and transmits information to the 8 AND gates 1, 2...8 since the switch $CR_2$ serves 8 outgoing lines; gate 3 receives a clock impulse at the time $t_{s3}$, at the same time as the control memory $MC_2$ which opens this AND gate No. 3 and the information from the buffer memory $MT_8$, temporal channel 22 is applied to register $R_3$ and then transmitted to the called party by the line $LRS_{11}$.

The incoming information on line $LRE_8$, temporal channel 22, is stored in $MT_8$ until the reading instruction arrives which depends on the number of the outgoing temporal channel of the called party, i.e. until channel 17 appears at the output of the control memory. Information is thus stored for a duration of not more than one period of repetitive operation $P_R$, or 125 microseconds in the case of a sampling frequency of 8,000 cps.

Of course, the invention is in no way limited to the embodiment described and illustrated, which has been referred to only by way of example. More particularly, it will be possible without departing from the scope of the invention to modify certain arrangements or to replace certain means by equivalent means.

I claim:

1. In a connecting network arrangement free from blocking, in a system for the time switching of analog or digital data, by means of which network arrangement there can be routed along at least $N$ outgoing network lines having $P$ time channels each of Q items of information, contained in $N$ incoming network lines having P time channels, said network arrangement being constructed to allow at any instant for the items of information contained in the pth time channel of the nth incoming network line to be routed to the p'th time channel of the n'th outgoing network line, $p$, $n$, $p'$ and $n'$ being any numbers and to allow all the NP incoming time channels to be routed to the NP outgoing time channels, an improved connecting network comprising:

a. N buffer memories each adapted to receive information from a corresponding one of said incoming network lines, b. a plurality of distributor means each adapted to place information on a certain number of outgoing network lines, c. a junction line for routing information from said buffer memories to each distributor means, and d. a single control memory being associated with each junction line for controlling the output from said buffer memories to said distributor means.

2. Connecting network arrangement according to claim 1, wherein each said control memory contains for each time channel of the outgoing network lines of the group the address of the buffer memory and the address of that point in said buffer memory which is capable of giving the Q elemental items of information, each control memory connected by an address line to all the buffer memories.

3. Connecting network arrangement according to claim 2, further comprising:

a. as many said buffer memories as there are incoming network lines, each said buffer memory having P memory words comprising one memory word per time channel, said memory words being composed of Q bits, b. $N_1$ junction lines, along each of which the items of information intended for a group of $n_2$ outgoing network lines, where $N_1N_2 \geq N$, are subjected to time-division multiplexing, c. $N_1$ distributors for switching, from the junction lines, the items of information intended for the $N_2$ network lines of the group, and d. a time base citcuit for distributing signals for the syncronization of the whole arrangement.

4. Connecting network arrangement according to claim 3, characterized in that the control memory consists of a circulating memory.

5. Connecting network arrangement according to claim 4, wherein the control memory is divided into a plurality of memory blocks said memory blocks being sampled to find on the address line items of information distributed in time.

6. Connecting network arrangement according to claim 5, wherein the primary time channel is divided along the address lines into $N_2 + 1$ secondary time channels, $N_2$ being the number of outgoing network lines per group.

* * * * *